US012554214B2

(12) United States Patent
Kawakami et al.

(10) Patent No.: US 12,554,214 B2
(45) Date of Patent: Feb. 17, 2026

(54) DEVELOPING CARTRIDGE HAVING A SHEET MEMBER PROVIDED AT END PORTION OF A DEVELOPING ROLLER

(71) Applicant: CANON KABUSHIKI KAISHA, Tokyo (JP)

(72) Inventors: Takuya Kawakami, Mishima (JP); Noriyuki Komatsu, Numazu (JP); Tetsuya Numata, Suntou-gun (JP); Naoya Asanuma, Susono (JP); Daisuke Makiguchi, Izunokuni (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/385,956

(22) Filed: Nov. 1, 2023

(65) Prior Publication Data

US 2024/0061362 A1 Feb. 22, 2024

Related U.S. Application Data

(62) Division of application No. 17/950,197, filed on Sep. 22, 2022, now Pat. No. 11,841,647, which is a (Continued)

(30) Foreign Application Priority Data

Dec. 28, 2018 (JP) ................................ 2018-246406

(51) Int. Cl.
*G03G 15/08* (2006.01)
*G03G 21/10* (2006.01)
(Continued)

(52) U.S. Cl.
CPC ..... *G03G 15/0898* (2013.01); *G03G 15/0817* (2013.01); *G03G 21/10* (2013.01);
(Continued)

(58) Field of Classification Search
CPC .......... G03G 15/0898; G03G 15/0817; G03G 21/1814; G03G 21/0011; G03G 21/0082;
(Continued)

(56) References Cited

U.S. PATENT DOCUMENTS 4,168,901 A 9/1979 Ito et al.
4,992,830 A 2/1991 Kohyama
(Continued)

FOREIGN PATENT DOCUMENTS

JP S57-135970 A 8/1982
JP S60-238875 A 11/1985
(Continued)

OTHER PUBLICATIONS

Aug. 1, 2023 Office Action in Japanese Patent Application No. 2022-204601.

*Primary Examiner* — Robert B Beatty
(74) *Attorney, Agent, or Firm* — Venable LLP

(57) ABSTRACT

A cartridge detachably mountable to a main assembly of an image forming apparatus includes a photosensitive member unit including a photosensitive drum; a sheet configured to remove a deposited matter from a surface of the drum, the sheet being in contact with the surface of the drum at an end portion of the drum with respect to a rotational axis direction of the member; and a developing unit detachably mounted to the member unit, the developing unit including a developing roller configured to supply toner to the drum, and a storage portion configured to store the deposited matter removed from the surface of the drum by the sheet.

5 Claims, 7 Drawing Sheets

Related U.S. Application Data division of application No. 17/396,846, filed on Aug. 9, 2021, now Pat. No. 11,480,916, which is a division of application No. 16/728,274, filed on Dec. 27, 2019, now Pat. No. 11,112,753.

(51) Int. Cl.
*G03G 21/12* (2006.01)
*G03G 21/18* (2006.01)

(52) U.S. Cl.
CPC ......... *G03G 21/12* (2013.01); *G03G 21/1817* (2013.01); *G03G 21/1828* (2013.01); *G03G 2221/0057* (2013.01); *G03G 2221/0063* (2013.01); *G03G 2221/1853* (2013.01)

(58) Field of Classification Search
CPC .... G03G 21/10; G03G 21/12; G03G 21/1828; G03G 21/1817; G03G 2221/1853; G03G 2221/0026; G03G 2221/0042; G03G 2221/0057; G03G 2221/0063
USPC ........... 399/99, 102, 111, 113, 264, 350, 358
See application file for complete search history.

(56) References Cited

U.S. PATENT DOCUMENTS 5,987,277 A * 11/1999 Okabe .................... G03G 21/10 399/105
6,671,477 B2 12/2003 Komatsu et al.
7,024,131 B2 4/2006 Komatsu et al.
7,110,703 B2 9/2006 Uratani et al.
7,156,797 B2 1/2007 Komatsu et al.
7,171,137 B2 1/2007 Lee et al.
7,266,326 B2 9/2007 Karakama et al.
7,283,765 B2 10/2007 Uratani et al.
7,769,316 B2 8/2010 Kimura
8,121,517 B2 2/2012 Asanuma et al.
8,139,972 B2 3/2012 Abe et al.
8,270,876 B2 9/2012 Morioka et al.
8,270,879 B2 9/2012 Numata et al.
8,369,744 B2 2/2013 Asanuma et al.
8,417,152 B2 4/2013 Takeyama et al.
8,472,838 B2 6/2013 Numata et al.
8,478,161 B2 7/2013 Numata et al.
8,483,589 B2 7/2013 Uneme et al.
8,521,060 B2 8/2013 Numata et al.
8,571,445 B2 10/2013 Komatsu et al.
8,594,527 B2 11/2013 Nagae et al.
8,670,688 B2 3/2014 Jeno et al.
8,688,004 B2 4/2014 Asanuma et al.
8,787,794 B2 7/2014 Miyazaki et al.
8,942,592 B2 1/2015 Uratani et al.
9,052,638 B2 6/2015 Matsumaru et al.
9,069,289 B2 6/2015 Batori et al.
9,116,466 B2 8/2015 Makiguchi et al.
9,164,424 B2 10/2015 Nakamuri et al.
9,164,430 B2 10/2015 Murakami et al.
9,188,906 B2 11/2015 Batori et al.
9,229,371 B2 1/2016 Murakami et al.
9,304,483 B2 4/2016 Komatsu et al.
9,395,679 B2 7/2016 Kawakami et al.
9,417,604 B2 8/2016 Matsumaru et al.
9,442,457 B2 9/2016 Maeda et al.
9,465,318 B2 10/2016 Takeuchi et al.
9,471,031 B2 10/2016 Kusano et al.
9,494,890 B2 11/2016 Komatsu et al.
9,523,942 B2 12/2016 Takeuchi et al.
9,599,932 B2 3/2017 Takeuchi et al.
9,772,598 B2 9/2017 Komatsu et al.
9,778,613 B2 10/2017 Komatsu et al.
9,823,619 B2 11/2017 Kawakami et al.
9,823,621 B2 11/2017 Miyamoto et al.
9,836,016 B2 12/2017 Kawakami et al.
9,857,730 B2 1/2018 Kato et al.
9,989,892 B2 6/2018 Takeuchi et al.
10,037,000 B2 7/2018 Torii et al.
10,042,314 B2 8/2018 Tomita et al.
10,095,161 B2 10/2018 Takeuchi et al.
10,095,180 B2 10/2018 Harada et al.
10,191,446 B2 1/2019 Miyamoto et al.
10,197,967 B2 2/2019 Komatsu et al.
10,228,635 B2 3/2019 Kato et al.
10,551,790 B2 2/2020 Komatsu et al.
10,599,094 B2 3/2020 Miyamoto et al.
11,112,753 B2 9/2021 Kawakami et al.
11,480,916 B2 10/2022 Kawakami et al.
2005/0095028 A1 5/2005 Lee et al.
2007/0041750 A1 2/2007 Mizuta
2007/0122182 A1* 5/2007 Matsushita ........ G03G 15/0817 399/103
2009/0297205 A1 12/2009 Nagae et al.
2013/0051850 A1* 2/2013 Sato ....................... G03G 21/00 399/111
2014/0112686 A1 4/2014 Miyamoto et al.
2017/0248869 A1 8/2017 Asanuma et al.
2017/0322512 A1 11/2017 Matsumoto et al.
2018/0046133 A1 2/2018 Kawakami et al.
2018/0120737 A1 5/2018 Okamoto et al.
2018/0136601 A1 5/2018 Tauchi
2019/0227480 A1 7/2019 Fujiwara et al.
2020/0073287 A1 3/2020 Akiba et al.
2020/0073288 A1 3/2020 Nakamura et al.
2020/0081396 A1 3/2020 Fujiwara et al.
2020/0174423 A1 6/2020 Ogawa et al.
2020/0341427 A1 10/2020 Komatsu et al.

FOREIGN PATENT DOCUMENTS

JP H01-154078 A 6/1989
JP H03-246571 A 11/1991
JP H06-035384 A 2/1994
JP 11-095551 A 4/1999
JP 2000-132029 A 5/2000
JP 7200432 B2 1/2003
JP 2010-008993 A 1/2010
JP 2011-257650 A 12/2011
JP 2016-142873 A 8/2016
JP 2016224221 A 12/2016
JP 2018-025653 A 2/2018

* cited by examiner

DEVELOPING CARTRIDGE HAVING A SHEET MEMBER PROVIDED AT END PORTION OF A DEVELOPING ROLLER

FIELD OF THE INVENTION AND RELATED ART

The present invention relates to a cartridge such as a process cartridge and a developing cartridge, which are used for an image forming apparatus.

An image forming apparatus such as a laser beam printer and a laser beam copying machine which uses an electrophotographic image forming method forms an image on recording medium by forming a toner image on its photosensitive member, and transferring this toner image onto recording medium such as paper. In the field of an image forming apparatus such as the one described above, it is common practice to place some components of the apparatus in a cartridge, which can be moved out of the main assembly of the apparatus, in order to maintain and/or replace some of the components. In Japanese Laid-open Patent Application No. 2016-224221, a process cartridge structured so that its development unit for storing toner, as developer, is removably attachable to its photosensitive member unit which has a photosensitive member, is disclosed.

An image forming apparatus is structured so that paper dust and/or toner removed from the surface of a photosensitive member is stored in its storage for the paper dust and toner. Thus, increasing a photosensitive member unit in life span makes it possible for the paper dust and/or toner to overflow out of the storage. Thus, it is possible that as the paper dust and/or toner overflows out of the storage, they will soil the adjacencies of the storage and/or adhere to the photosensitive drum, development roller, transfer roller, and the like, which may cause such a problem that the apparatus outputs unsatisfactory images.

Therefore, the present invention was made to solve the problem described above. Thus, its primary object is to provide a process cartridge which prevents the problem that the paper dust, toner, and the like, removed from the peripheral surface of a photosensitive drum overflow out of the storage therefor.

SUMMARY OF THE INVENTION

According to an aspect of the present invention, there is provided a cartridge detachably mountable to a main assembly of an image forming apparatus, said cartridge comprising a photosensitive member unit including a photosensitive drum; a sheet configured to remove a deposited matter from a surface of said photosensitive drum, said sheet being in contact with the surface of said photosensitive drum at an end portion of said photosensitive drum with respect to a rotational axis direction of said photosensitive member; and a developing unit detachably mounted to said photosensitive member unit, said developing unit including a developing roller configured to supply toner to said photosensitive drum, and a storage portion configured to store the deposited matter removed from the surface of said photosensitive drum by said sheet.

According to another aspect of the present invention, there is provided a developing cartridge detachably mountable to a photosensitive member cartridge detachably mountable to a main assembly of an image forming apparatus, said photosensitive member cartridge including a photosensitive drum; a sheet configured to remove a deposited matter from a surface of said photosensitive drum, said sheet being in contact with the surface of said photosensitive drum at an end portion of said photosensitive drum with respect to a rotational axis direction of said photosensitive member, said developing cartridge comprising: a developing roller configured to supply the toner to said photosensitive drum; and a storage portion configured to store the deposited matter removed from the surface of said photosensitive drum by said sheet.

Further features of the present invention will become apparent from the following description of exemplary embodiments with reference to the attached drawings.

DESCRIPTION OF THE EMBODIMENTS

Next, the process cartridge and developing cartridge, which are in accordance with the present invention, are concretely described, with reference to appended drawings. By the way, the structural components of the cartridges in the following description of the cartridges are not intended to limit the present invention in their function, material, shape, and positional relationship, unless specifically noted.

Embodiment 1

Figure 1:
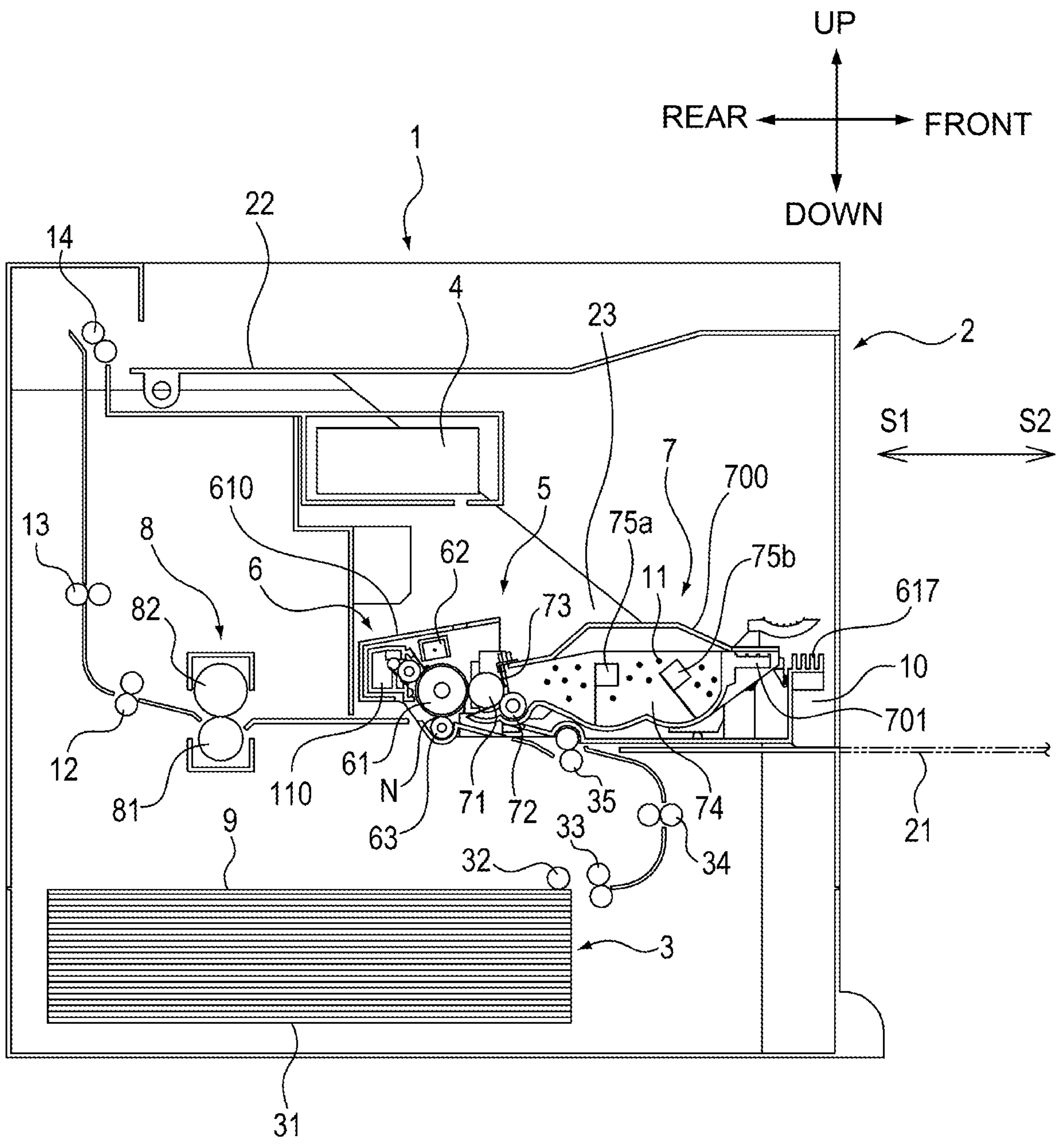
FIG. 1 is a sectional view of the image forming apparatus in the first embodiment of the present invention; it shows the structure of the apparatus.

To begin with, referring to FIGS. 1-4, the process cartridge 5 and developing cartridge 7, in the first embodiment of the present invention are described about their structure. FIG. 1 is a sectional view of the electrophotographic image forming apparatus 1 in this embodiment. It shows the structure of the apparatus. In the following description of the embodiments of the present invention, the orientation of the image forming apparatus 1 is defined with reference to the position of the user. That is, the side of the image forming apparatus 1, which is facing the user, is referred to as the front side; the opposite side from the user, the rear (back) side; the side (surface) which is facing upward, the top side; and the side (surface) which is facing downward is referred to as the bottom side.

Further, the side of the image forming apparatus 1, which is on the left as the image forming apparatus 1 is seen from the front side (from right side in FIG. 1), is referred to as the left side, and the side of the image forming apparatus 1, which is on the right side as the image forming apparatus 1 is seen from the front side, is referred to as the right side. Further, regarding the orientation of the process cartridge 5, it is assumed that the process cartridge 5 is properly situated in its image forming position in the image forming apparatus 1. Thus, the definition of the orientation of the process cartridge 5 is the same as the one for the image forming apparatus 1.

Further, the various directions in each drawing are defined by the arrow marks in the drawings. The front-rear direction, top-bottom direction, and left-right direction, which are indicated by these arrow marks, are perpendicular to each other. All the drawings are the same in the directions indicated by these arrow marks. Further, the top-bottom direction is parallel to the vertical direction. The left-right direction, and front-rear direction, are parallel to the horizontal direction.

Further, the left-right direction is parallel to the rotational axis of the photosensitive drum 61, and the rotational axis of the developing cartridge 7 as a developer bearing member which supplies the photosensitive drum 61 with toner. Further, after the installation of the developing cartridge 7 into the photosensitive member unit 6, the combination of the two is referred to as process cartridge 5. The proper direction S1 (installation direction) in which the process cartridge 5 is to be inserted into the main assembly 2 of the image forming apparatus 1 to be installed into the main assembly 2, and the proper direction S2 in which the process cartridge 5 is to be moved out of the main assembly 2, are parallel to the aforementioned front-rear direction, and are perpendicular to the left-right direction and top-bottom direction.

<Image Forming Apparatus>

FIG. 1 is a sectional view of the image forming apparatus 1 after the installation of the process cartridge 5. The sectional view is parallel to the top-bottom direction, and the front-rear direction, of the image forming apparatus 1. Referring to FIG. 1, the image forming apparatus 1 has a feeding portion 3 for feeding recording medium 9 such as a sheet of recording paper into the main assembly 2 of the image forming apparatus 1 (which hereafter will be referred to as apparatus main assembly 2). It has also an exposing apparatus 4 as an exposing means, and the process cartridge 5 which forms a toner image, which is an image formed of developer, onto the sheet 9 of recording medium. Moreover, it has a fixing apparatus 8 as a fixing means, which thermally fixes the toner image to the sheet 9 of recording medium after the transfer of the toner image onto the sheet 9.

<Feeding Portion>

The feeding portion 3 is disposed in the bottom portion of the apparatus main assembly 2. It has a feeder tray 31, a feed roller 32, and a separation roller 33. The sheets 9 of recording medium stored in the feeder tray 31 are moved out of the feeder tray 31, one by one, by the feed roller 32 while being separated from the rest. Then, each sheet 9 is conveyed further by a pair of conveyance rollers 34. As it is conveyed by the conveyance rollers 34, it comes into contact with a pair of registration rollers 35 which are remaining stationary, by its leading edge, being thereby corrected in attitude, if it were being conveyed askew. Then, it is conveyed toward a transfer nip N, which is formed by the photosensitive drum 61, with which the process cartridge 5 is provided, and a transfer roller 6 as a transferring means.

<Exposing Apparatus>

The exposing apparatus 4 is disposed in the top portion of the apparatus main assembly 2. It has an unshown laser light emitting portion, a polygon mirror, a lens, a reflection mirror, etc. The uniformly charged portion of the peripheral surface of the photosensitive drum 61 is scanned at a high speed by a beam of laser light emitted from the laser light emitting portion of the exposing apparatus 4 while being modulated by the data of the image to be formed. That is, the peripheral surface of the photosensitive drum 61 is exposed. Consequently, an electrostatic latent image, which is in accordance with the data of the image to be formed, is effected on the peripheral surface of the photosensitive drum 61.

<Image Forming Operation>

Next, referring to FIG. 1, the image forming operation of the process cartridge 5 is described. While an image forming process is carried out by the image forming apparatus 1, the photosensitive drum 61 is rotationally driven in the clockwise direction indicated in FIG. 1. As the photosensitive drum 61 is rotationally driven, the peripheral surface of the photosensitive drum 61 is uniformly charged by a charging apparatus 62 at first. Then, the uniformly charged portion of the peripheral surface of the photosensitive drum 61 is scanned by (exposed to) the beam of laser light emitted by the exposing apparatus 4 while being modulated by the data of the image to be formed. As a result, an electrostatic latent image, which is in accordance with the data of the image to be formed, is formed on the peripheral surface of the photosensitive drum 61.

Meanwhile, the toner 11 in a toner storage portion 74 is supplied to a development roller 71 by way of a supply roller 72 while being stirred by the second stirring member **75*b* and the first stirring member 75*a*. Then, the toner 11 on the development roller 71 is moved through the gap between the development roller 71 and a toner layer thickness regulating blade 73**, being thereby turned into a thin layer of toner which is preset in thickness.

The toner 11 borne on the peripheral surface of the development roller 71 is supplied to the electrostatic latent image on the peripheral surface of the photosensitive drum 61. Consequently, the toner 11 adheres to the electrostatic latent image on the peripheral surface of the photosensitive drum 61, turning thereby the latent image into a visible image. That is, the electrostatic latent image on the peripheral surface of the photosensitive drum 61 is developed into a visible image, that is, an image formed of toner 11. Then, the sheet 9 of recording medium is delivered to the transfer nip N between the photosensitive drum 61 and transfer roller 63, and the toner image on the peripheral surface of the photosensitive drum 61 is transferred onto the sheet 9.

The fixing apparatus 8 is disposed in the rear portion of the process cartridge 5. It has a heat roller 81 and a pressure roller 82. As the sheet 9 of recording medium, which is bearing a toner image, is conveyed through the fixing apparatus 8, the sheet 9 and the toner image thereon are heated and pressed between the heat roller 81 and pressure roller 82. Consequently, the toner image is fixed to the sheet 9. After being conveyed through the fixing apparatus 8, the sheet 9 is conveyed further by a pair of conveyance rollers 12 and a pair of conveyance rollers 13. Then, it is discharged onto a delivery tray 22 by a pair of discharge rollers 14.

<Recovery of Transfer Residual Toner>

The toner 11, which was not transferred onto the sheet 9 of recording medium, remains on the peripheral surface of the photosensitive drum 61. This toner 11, which hereafter may be referred to as transfer residual toner (11), is recovered into the toner storage portion 74 of the developing cartridge 7 to be reused. More concretely, the peripheral surface of the photosensitive drum 61 is charged for the second time by the charging apparatus 62 to make the photosensitive drum 61 higher in surface potential level than the development roller 71. Thus, the transfer residual toner on the peripheral surface of the photosensitive drum 61, which is positively charged at this point in the process, transfers onto the development roller 71, and then, is recovered into the toner storage portion 74 from the peripheral surface of the development roller 71.

<Process Cartridge>

Figure 2:
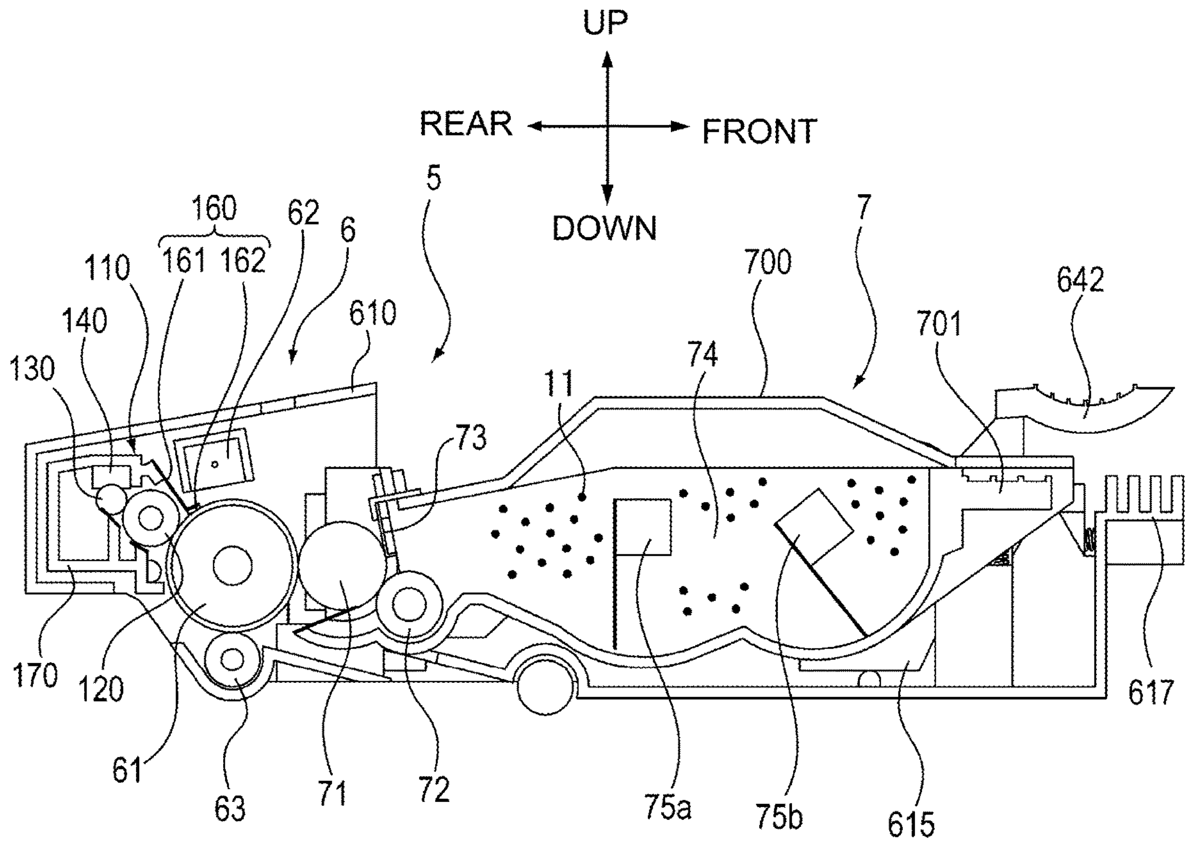
FIG. 2 is a sectional view of the process cartridge in the first embodiment; it shows the structure of the process cartridge.

Next, referring to FIGS. 1 and 2, the process cartridge 5 is described about its structure. FIG. 2 is a sectional view of the process cartridge 5 in this embodiment. It shows the structure of the process cartridge 5. The process cartridge 5 in FIG. 2 has the photosensitive member unit 6, and the developing cartridge 7 which is removably attachable to the photosensitive member unit 6.

Referring to FIG. 1, the process cartridge 5 is disposed below the exposing apparatus 4. The process cartridge 5 is installed into the apparatus main assembly 2. More concretely, the apparatus main assembly 2 is provided with a door 21 as a member which can be opened or closed. As the door 21 is opened into the position, which is indicated by a double-dot chain line in FIG. 1, an opening 10, with which the apparatus main assembly 2 is provided, is exposed. It is through this opening 10 that the process cartridge 5 is to be inserted into the cartridge chamber 22 of the apparatus main assembly 2 in the direction S1 indicated by a two-headed arrow mark. The process for taking the process cartridge 5 out of the apparatus main assembly 2 is as follows: First, the aforementioned door 21 of the apparatus main assembly 2 is to be opened into the position indicated by the double-dot chain line to expose the opening 10. Then, the process cartridge 5 is to be moved out of the apparatus main assembly 2 through the opening 10 in the direction S2 indicated by the two-headed arrow mark.

<Photosensitive Member Unit>

Figure 3:
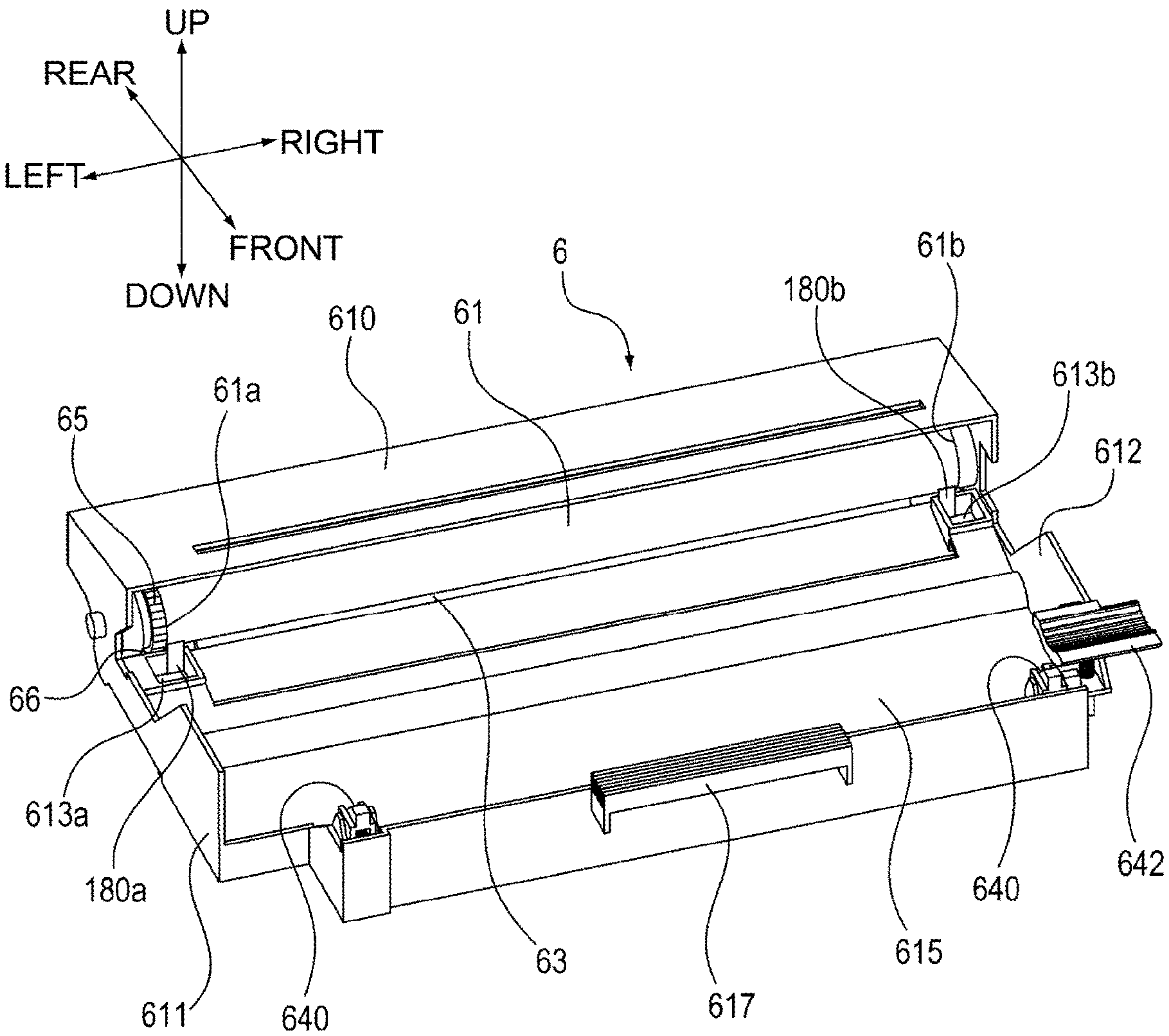
FIG. 3 is a perspective view of the photosensitive member unit in the first embodiment; it shows the structure of the unit.
Figure 4:
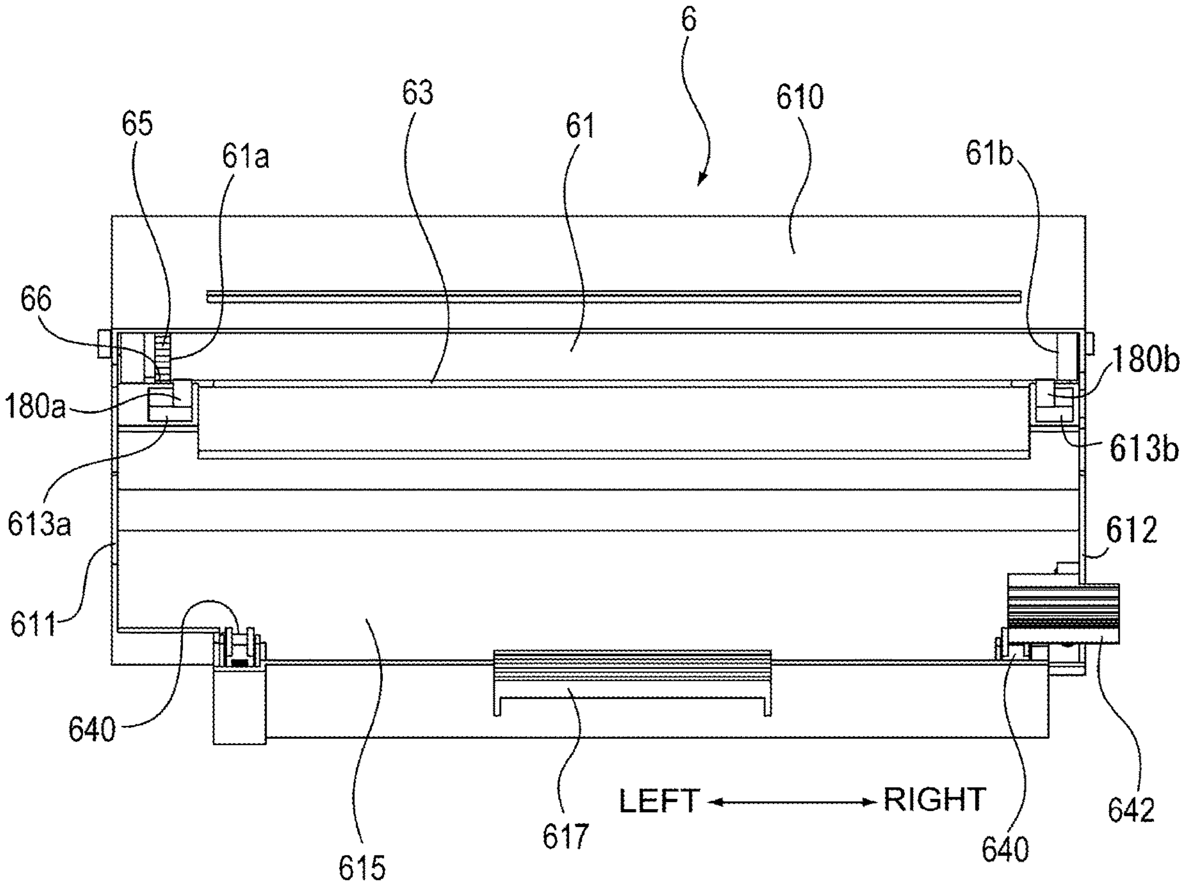
FIG. 4 is a perspective view of the photosensitive member unit in the first embodiment, as seen from the front-top side.

Next, referring to FIGS. 3 and 4, the photosensitive member unit 6 in this embodiment is described about its structure. FIG. 3 is a perspective view of the photosensitive member unit 6 in this embodiment. It shows the structure of the photosensitive member unit 6. FIG. 4 is a perspective view of the photosensitive member unit 6 in this embodiment, as seen from the front-top side of the photosensitive member unit 6. Referring to FIG. 2, the photosensitive member unit 6, which is employed by the image forming apparatus 1, has: the photosensitive drum 61 as an image bearing member; charging apparatus 62 as a charging means; transfer roller 63 as a transferring means; and a paper dust removing apparatus 110 as a cleaning means.

The photosensitive member unit 6 has the photosensitive drum 61, and second contacting members 180*a* and 180*b*. The second contacting member 180*a* is placed in contact with the peripheral surface of one of the lengthwise end portions of the photosensitive drum 61 in terms of the direction of the rotational axis of the photosensitive drum 61, to remove the foreign substances such as toner 11 on the peripheral surface of the photosensitive drum 61. The photosensitive member unit 6 is in the form of a cartridge (photosensitive member cartridge).

The photosensitive member unit 6 has a frame 610 which supports the various components of the photosensitive member unit 6. It has a pair of lateral walls, that is, the left and right walls 611 and 612. In the frame 610, the photosensitive drum 61 which is rotatable, transfer roller 63 which rotates in contact with the underside of the photosensitive drum 61, and charging apparatus 62 which faces the top side of the photosensitive drum 61, are disposed. One of the lengthwise end portions in terms of the direction of the rotational axis of the photosensitive drum 61 is fitted with a gear 65, which is in mesh with a transfer gear 66 for transmitting driving force to the transfer roller 63.

The frame 610 is provided with a knob for a user to hold the photosensitive member unit 6. It is also provided with a chamber 615 for the development unit 7, a pair of pressing members 640 for pressing the development unit 7, and a lifting member 642 for lifting the development unit 7.

The lifting member 642 keeps the development roller 71 pressed toward the photosensitive drum 61, by pressing the development unit 7 after the installation of the development unit 7 into the photosensitive member unit 6. The lifting member 642 is to be used by a user to move the development unit 7 out of the photosensitive member unit 6 to replace the development unit 7.

<Paper Dust Removing Apparatus>

Referring to FIG. 2, the paper dust removing apparatus 110 has a frame 170, a first removal roller 120, a second removal roller 130, a pair of elastic members 140, and a first contacting member 160. The first contacting member 160 has a support portion 161, by which the first contacting member 160 is supported by the frame 170, and a contacting portion 162, which is placed in contact with the peripheral surface of the photosensitive drum 61.

The first removal roller 120 rotates in contact with the rear side of the photosensitive drum 61. It recovers the paper dust on the peripheral surface of the photosensitive drum 61. The second removal roller 130 rotates in contact with the rear side of the first removal roller 120. It causes the paper dust on the first removal roller 120 to adhere to itself. Each elastic member 140 is in contact with the top portion of the peripheral surface of the corresponding lengthwise end portion of the second removal roller 130. It scrapes away the paper dust on the second removal roller 130.

The first contacting member 160 has a support portion 161 fixed to the frame 170 by one of its lengthwise end portions, and a fibrous contacting portion 162 by which it is placed in contact with the photosensitive drum 61. It recovers such a portion of the paper dust on the first removal roller 120, that the first removal roller 120 failed to remove, while allowing the residual toner 11 on the peripheral surface of the photosensitive drum 61 to escape.

<Development Unit>

The development unit 7 is in the form of a cartridge (developing cartridge) which is removably installable in the photosensitive member unit 6. It has the toner storage portion 74 for storing the toner 11 as developer. The toner storage portion 74 is a part of the frame 170. Further, the development unit 7 has a combination of first and second stirring members 75*a* and 75*b* which conveys the toner 11 in the toner storage portion 74 to the supply roller 72 while stirring the toner 11.

Further, the development unit 7 has the supply roller 72 which supplies the toner 11, as developer, in the toner storage portion 74 to the development roller 71. Further, it has the development roller 71, as a developer bearing member, which rotates in contact with the photosensitive drum 61. Moreover, it has the regulating blade 73 which regulates in thickness, the layer of toner 11 borne on the peripheral surface of the development roller 71. The supply roller 72 rotates in contact with the development roller 71.

The toner 11 in the toner storage portion 74 is conveyed, while being stirred, toward the supply roller 72 by the first and second stirring members 75*a* and 75*b* which are being rotated. Thereafter, the toner 11 is conveyed toward the development roller 71 by the supply roller 72, and borne by the peripheral surface of the development roller 71 by being pulled up onto the peripheral surface of the development roller 71 by the magnetic force from a magnetic roller disposed in the development roller 71. Then, the layer of toner 11, which is on the peripheral surface of the development roller 71, is regulated in thickness by the regulating blade 73. The frame 700 supports various components in the development unit 7. The development roller 71 is rotatably supported by the frame 700, by its lengthwise end portions in terms of the direction parallel to its rotational axis. The front side of the development unit 7 is provided with a knob 701 for a user to hold the development unit 7.

<Storage Portion>

Next, referring to FIGS. 3 and 4, the storage portion is described about its structure. FIG. 4 is a perspective view of the photosensitive member unit 6, as seen from the top-front side of the photosensitive member unit 6. To the frame of the photosensitive member unit 6, the second contacting members 180*a* and 180*b*, which are in the form of a piece of sheet, are attached. The second contacting members 180*a* and 180*b* are in contact with the surface of the lengthwise end portions of the photosensitive drum 61, one for one, in terms of the direction parallel to the rotational axis of the photosensitive drum 61. It removes adherent residues such as paper dust and toner 11 which are remaining adhered to the peripheral surface of the photosensitive drum 61. The development roller 71 is in contact with the photosensitive drum 61, forming a developmental area of contact 970. The second contacting members 180*a* and 180*b* are in contact with the peripheral surface of the photosensitive drum 61, on the downstream side of the area of the peripheral surface of the photosensitive drum 61, which corresponds in position to the developmental area of contact 970, and on the upstream side of the area of the peripheral surface of the photosensitive drum 61, which corresponds in position to the transfer nip N, in terms of the rotational direction of the photosensitive drum 61.

Figure 5:
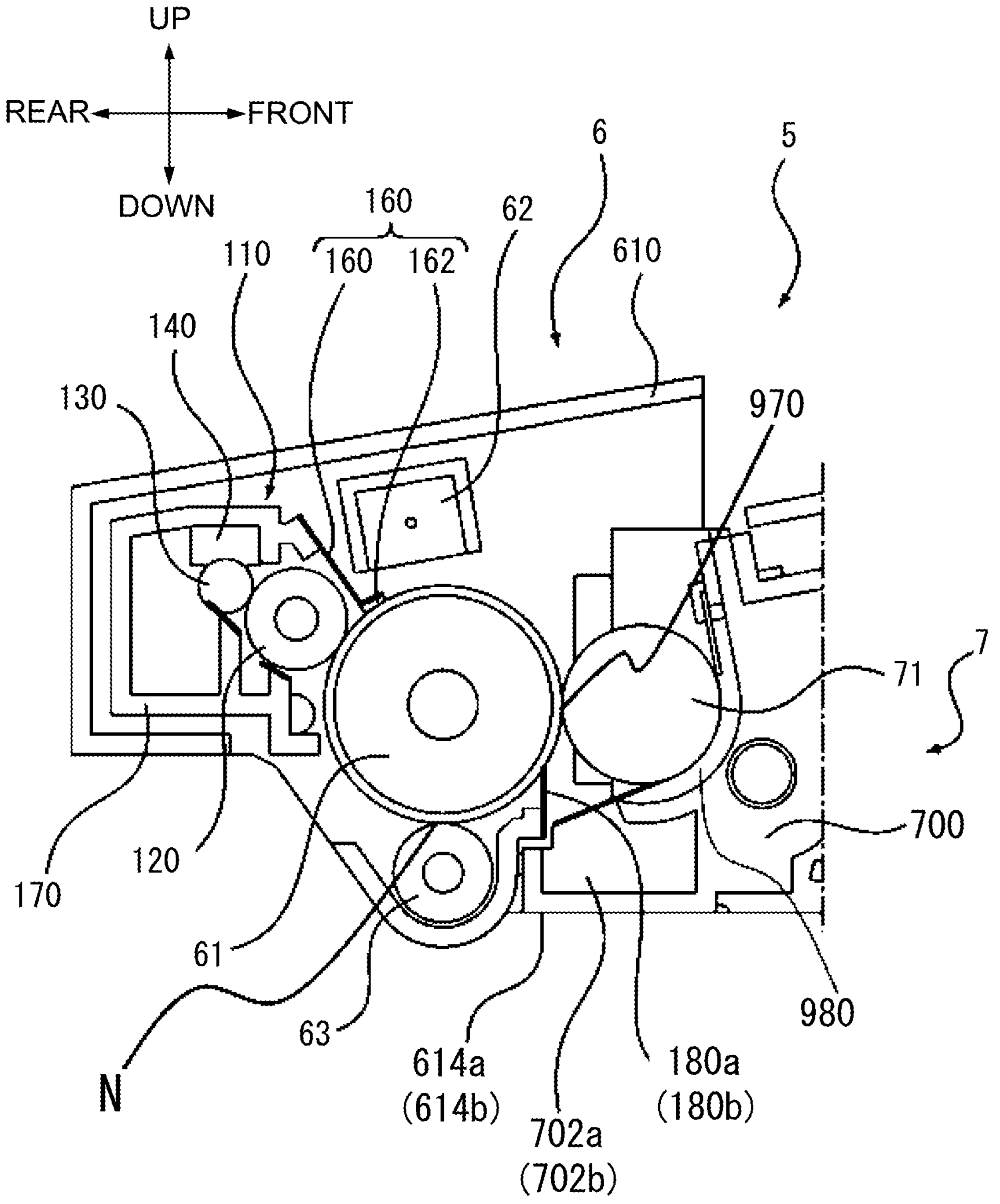
FIG. 5 is a sectional view of a part of the process cartridge in the second embodiment; it shows the structure of the part.
Figure 7:
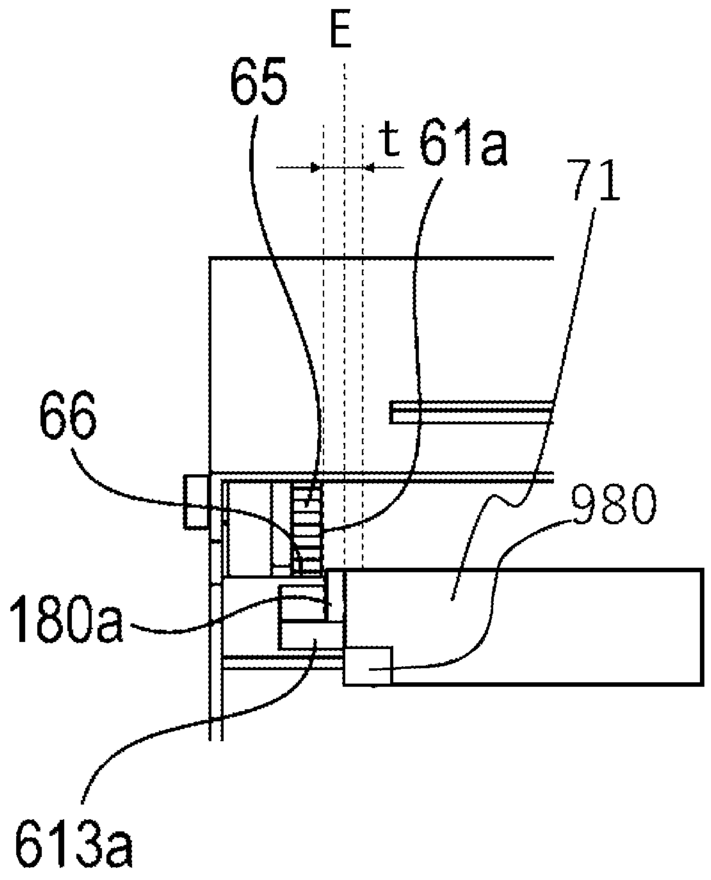
FIG. 7 is an enlarged perspective view of a part (one of lengthwise end portions) of the process cartridge shown in FIG. 4; it shows the development roller, and development unit sealing member.

FIG. 7 is an enlarged view of a part of the lengthwise end portions of the process cartridge 5, in terms of the direction parallel to the rotational axis of the photosensitive drum 61. It shows the development roller 71 and a sealing member 980 (frame 700 is not shown, in order to make it easier to understand structure). The sealing member 980 shown in FIGS. 5 and 7 is such a sealing member that is positioned to seal the gap between the lengthwise end portion of the development roller 71, and the frame 700.

Referring to FIG. 7, one of the lengthwise ends E of the development roller 71 in terms of the direction parallel to the rotational axis of the photosensitive drum 61 is within a range t of the second contacting member 180*a* in terms of the direction parallel to the rotational axis of the photosensitive drum 61. That is, the second contacting portion 180*a* is positioned so that it overlaps with the corresponding lengthwise end of the development roller 71, in terms of the direction of the rotational axis of the development roller 71. Further, the second contacting portion 180*a* is positioned so that it overlaps with the area of the development roller 71, which is in contact with the sealing member 980 in terms of the direction of the rotational axis of the development roller 71. The positional relationship between the other lengthwise end portion of the second contacting member 180*b*, and that of the development roller 71, is similar to that of the first lengthwise end portion of the second contacting portion 180*a*, and the first lengthwise end of the development roller 71.

The frame 610 of the photosensitive member unit 6 is provided with a pair of storage portions 613*a* and 613*b* for storing the adherent residues, such as paper dust and toner 11, which were removed from the peripheral surface of the photosensitive drum 61 by the second contacting members 180*a* and 180*b* which are in the form of a piece of sheet. The image forming apparatus 1 is structured so that when the photosensitive member unit 6 is in the image forming position in the image forming apparatus 1, the storage portions 613*a* and 613*b* are directly below the second contacting members 180*a* and 180*b*, which are in the form of a piece of sheet and correspond in position to the lengthwise end portions of the photosensitive drum 61 in terms of the direction of the rotational axis of the photosensitive drum 61. That is, the storage portions 613*a* and 613*b* are positioned so that their position corresponds to the areas of the photosensitive drum 61, which are in contact with the second contacting members 180*a* and 180*b* which are in the form of a piece of sheet.

The second contacting members 180*a* and 180*b* remove such toner 11 that is remaining adhered to the areas of the peripheral surface of the photosensitive drum 61, which are remaining on the left and right sides, respectively, of the development roller 71 in terms of the direction of the rotational axis of the photosensitive drum 61, because the development unit 7 could not recover. That is, the second contacting members 180*a* and 180*b* remove the paper dust on the peripheral surface of the photosensitive drum 61, on the left and right sides of the first contacting member 160.

In terms of the direction of the rotational axis of the photosensitive drum 61, the end portion of the photosensitive drum 61, which is on the same side as the storage portion 613*a*, is fitted with a gear 65. Referring to FIG. 4, the left storage 613*a*, in terms of the direction of the rotational axis of the photosensitive drum 61, extends inward of the cartridge from the outward side of the gear 65, beyond the end surface 61*a* of the photosensitive drum 61. As for right storage portion 613*b*, or the storage portion on the other end of the photosensitive drum 61 in terms of the direction of the rotational axis of the photosensitive drum 61, extends inward of the frame from the outward side of the other end surface 61*b* of the photosensitive drum 61.

The photosensitive member unit 6 is structured so that its storage portions 613*a* and 613*b* are substantially greater in capacity than those of any conventional photosensitive member unit 6 as described above. Therefore, even if the photosensitive member unit 6 is substantially increased in life span, it is possible to prevent the problem that adherent residual substances such as paper dust and toner 11 overflows out of the storage portions 613*a* and 613*b*. Therefore, it is possible to prevent the problem that paper dust, toner 11, and the like adherent residual substances, overflows out of the storage portions 613*a* and 613*b*, and soil the adjacencies of the storage portions, and/or adhere to the photosensitive drum 61, development roller 71, transfer roller 63, etc. Therefore, it is possible to prevent the problem that the image forming apparatus 1 is made to output unsatisfactory images, by the paper dust, toner 11, and the like adherent residual substances from the storage portions 613*a* and 613*b*.

By the way, in this embodiment, the photosensitive member unit 6 was provided with the pair of storage portions 613*a* and 613*b*, the position of which corresponds to the lengthwise end portions, one for one, of the photosensitive drum 61 in terms of the direction of the rotational axis of the photosensitive drum 61. However, it may be only one side of the photosensitive member unit 6 that is provided with a storage portion 613. Such an arrangement can provide the same effects as those provided by this embodiment.

Embodiment 2

Next, referring to FIG. 5, the process cartridge in this embodiment of the present invention is described about its structure. By the way, the components of the process cartridge in this embodiment, which are the same in structure as the counterparts in the first embodiment are given the same referential codes, or the same names, as those given to the counterparts, and are not described. FIG. 5 is a sectional view of a part of the process cartridge 5 in this embodiment. It shows the structure of the cartridge. In the first embodiment, a part of the frame 610 of the photosensitive member unit 6 was provided with the pair of second contacting members 180*a* and 180*b*, which were in the form of a piece of sheet, and the pair of storage portions 613*a* and 613*b*.

In this embodiment, the frame 610 of the photosensitive member unit 6 is provided with the second contacting members 180*a* and 180*b*, which are in the form of a piece of sheet. Further, the frame 700 of the development unit 7 is provided with a pair of storage portions 702*a* and 702*b* for storing the paper dust, toner 11, and the like adherent residual substances, which were removed by the second contacting members 180*a* and 180*b*, with which the frame 610 of the photosensitive member unit 6 is provided.

The process cartridge 5 employed by the image forming apparatus 1 has the photosensitive member unit 6, and the development unit 7 which is removably attachable to the photosensitive member unit 6. The photosensitive member unit 6 has the photosensitive drum 61, and the gear 65, with which one of the lengthwise end portions of the photosensitive drum 61, in terms of the direction of the rotational axis of the photosensitive drum 61, is fitted.

Further, the photosensitive member unit 6 has the pair of second contacting members 180*a* and 180*b*, which are in the form of a piece of sheet. The second contacting members 180*a* and 180*b* remove the paper dust, toner 11, and the like adherent residual substance on the peripheral surface of the lengthwise end portions of the photosensitive drum 61 in terms of the direction of the rotational axis of the photosensitive drum 61, by being placed in contact with the peripheral surface of the lengthwise end portions of the photosensitive drum 61. Further, the photosensitive member unit 6 has a chamber 615 in which the development unit 7 is installable. The second contacting members 180*a* and 180*b* are attached to the frame 610 of the photosensitive member unit 6.

The development unit 7 has the development roller 71. Further, the development unit 7 is provided with the storage portions 702*a* and 702*b* for storing the paper dust, toner 11, and the like adherent residual substances which were removed by the second contacting members 180*a* and 180*b*. The photosensitive member unit 6 is structured so that when the process cartridge 5 is in its image forming position in the image forming apparatus 1, the second contacting members 180*a* and 180*b*, which are in the form of a piece of sheet, are directly below the lengthwise end portions of the photosensitive drum 61, one for one, in terms of the direction of the rotational axis of the photosensitive drum 61.

The storage portion 702*a*, which is below one of the lengthwise end portions of the photosensitive drum 61 in terms of the direction of the rotational axis of the photosensitive drum 61, extends inward of the photosensitive member unit 6 from the outward side of the gear 65 to the inward side of the lengthwise end surface 61*a* of the photosensitive drum 61 in terms of the direction of the rotational axis of the photosensitive drum 61. The storage portion 702*b*, which is below the other lengthwise end portion of the photosensitive drum 61 in terms of the direction of the rotational axis of the photosensitive drum 61, extends inward of the photosensitive member unit 6 from the outward side of the end surface 61*b* of the other lengthwise end of the photosensitive drum 61, to the inward side of the end surface 61*b*. The storage portions 702*a* and 702*b* for storing the paper dust, toner 11, and the like adherent residual substances which were removed by the second contacting members 180*a* and 180*b* are attached to the frame 700 of the development unit 7.

The frame 610 of the photosensitive member unit 6 is provided with a pair of recesses 614*a* and 614*b*, which correspond in position to the storage portions 702*a* and 702*b*, one for one. Therefore, each time the development unit 7 is replaced, the paper dust, toner 11, and the like adherent residual substances, which collected in the storage portions 702*a* and 702*b* are removed. Thus, even if the photosensitive member unit 6 is extended further in life expectancy compared to the one in the first embodiment, it is possible to prevent the problem that the paper dust, toner 11, and the like adherent residual substance overflow out of the storage portions 702*a* and 702*b*.

By increasing the storage portions 702*a* and 702*b* in capacity as described above, it is possible to prevent the paper dust, toner 11, and the like adherent residual substances from overflowing out of the storage portions 702*a* and 702*b*, even if the photosensitive member unit 6 is further extended in life expectancy. Otherwise, the photosensitive member unit 6 in this embodiment is similar in structure to the one in the first embodiment, and can provide the similar effects to those provided by the one in the first embodiment.

Embodiment 3

Figure 6:
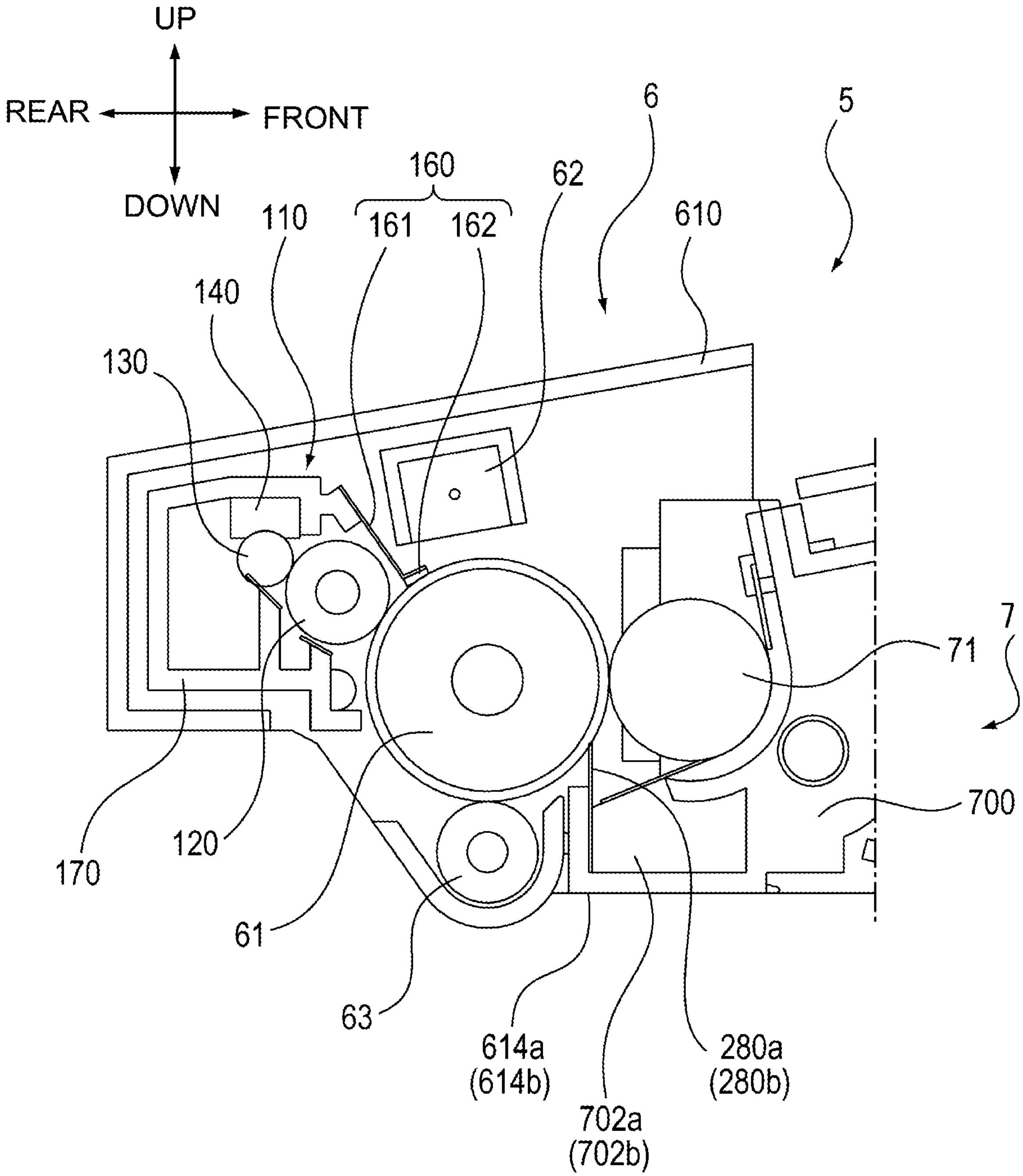
FIG. 6 is a sectional view of a part of the process cartridge in the third embodiment; it shows the structure of the part.

Next, referring to FIG. 6, the process cartridge in the third embodiment of the present invention is described about its structure. By the way, the components of the process cartridge in this embodiment, which are the same in structure as the counterparts in each of the preceding embodiment are given the same referential codes, or the same names, as those given to the counterparts, and are not described. FIG. 6 is a sectional view of a part of the process cartridge 5 in this embodiment. It shows the structure of the cartridge.

In the second embodiment, a part of the frame 700 of the development unit 7 was provided with storage portions 702*a* and 702*b*, and the frame 610 of the photosensitive member unit 6 was provided with the second contacting members 180*a* and 180*b* which were in the form of a piece of sheet. In this embodiment, the frame 700 of the development unit 7 is provided with the second contacting members 180*a* and 180*b* which are in the form of a piece of sheet, and storage portions 702*a* and 702*b* for storing the paper dust, toner 11, and the like adherent residual substances removed by the second contacting members 280*a* and 280*b*.

The process cartridge 5 for the image forming apparatus 1 has the photosensitive member unit 6 and development unit 7. The photosensitive member unit 6 has the photosensitive drum 61, gear 65 with which one of the lengthwise end portions of the photosensitive drum 61, in terms of the direction parallel to the rotational axis of the photosensitive drum 61, is fitted, and cartridge chamber 615 in which the development unit 7 is removably installable.

As for the development unit 7, it has the development roller 71. Further, the development unit 7 has the second contacting members 280*a* and 280*b* which are in the form of a piece of sheet. The second contacting members 280*a* and 280*b* are in contact with the peripheral surface of the corresponding end portions of the photosensitive drum 61, one for one, in terms of the direction parallel to the axial line of the photosensitive drum 61, and remove the paper dust, toner 11, and the like adherent residual substances on the peripheral surface of the corresponding end portion.

Further, the development unit 7 has the storage portions 702*a* and 702*b* for storing the paper dust, toner 11, and the like adherent residual substances removed by the second contacting members 280*a* and 280*b*. The image forming apparatus 1 is structured so that when the process cartridge 5 is in its image forming position in the image forming apparatus 1, storage portions 702*a* and 702*b* are at the lengthwise end portions of the process cartridge 5, in terms of the direction parallel to the rotational axis of the photosensitive drum 61, and below the second contacting members 280*a* and 280*b* which are in the form of a piece of sheet.

The storage portion 702*a* which corresponds in position to one of the lengthwise end portions of the photosensitive drum 61 in terms of the direction parallel to the axial line of the photosensitive drum 61 extends inward of the photosensitive member unit 6, from the outward side of the gear 65 in terms of the direction parallel to the rotational axis of the photosensitive drum 61, to the inward side of the end surface 61*a* of the photosensitive drum 61. As for the storage portion 702*b*, which corresponds in position to the other lengthwise end portion of the photosensitive drum 61, it extends inward of the photosensitive member unit 6 from the outward side of the other lengthwise end surface 61*b* of the photosensitive drum 61 in terms of the direction parallel to the rotational axis of the photosensitive drum 61.

Referring to FIG. 6, the frame 700 of the development unit 7 is provided with the second contacting members 280*a* and 280*b* for removing the paper dust, toner 11, and the like adherent residual substances on the peripheral surface of the photosensitive drum 61. Further, the frame 700 of the development unit 7 is provided with storage portions 702*a* and 702*b* for storing the paper dust, toner 11, and the like adherent residual substances removed by the second contacting members 280*a* and 280*b* which are in the form of a piece of sheet.

Therefore, every time the development unit 7 is replaced, the second contacting members 280*a* and 280*b* are also replaced. Therefore, even if the photosensitive member unit 6 is made longer in life expectancy than the one in the second embodiment, it does not occur that the photosensitive member unit 6 reduces in performance in terms of the removal of the paper dust, toner 11, and the like adherent residual substances made to adhere to the peripheral surface of the photosensitive drum 61 by the friction between the peripheral surface of the photosensitive drum 61 and the second contacting members 280*a* and 280*b*. That is, even if the photosensitive member unit 6 is further extended in life expectancy than the one in the second embodiment, it is possible to prevent the paper dust, toner 11, and the like adherent residual substances from overflowing out of the storage portions 702*a* and 702*b*. Otherwise, the photosensitive member unit 6 is this embodiment is similar in structure and effects to the photosensitive member unit 6 in each of the preceding embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-246406 filed on Dec. 28, 2018, which is hereby incorporated by reference herein in its entirety.

What is claimed is:

1. A developing cartridge mountable on an image forming apparatus, the developing cartridge comprising:

a frame provided with an accommodating portion configured to accommodate toner and an opening portion in fluid communication with the accommodating portion;

a developing roller supported by the frame, opposing the opening portion and configured to rotate about a rotational axis while carrying the toner;

a supplying roller in contact with the developing roller and configured to supply the toner from the accommodating portion to the developing roller;

a stirring member configured to stir the toner in the accommodating portion and supply the toner to the supplying roller;

a regulating member including a contacting portion in contact with the developing roller and a support portion supported by the frame, the regulating member being configured to regulate a thickness of a layer of the toner carried on a surface of the developing roller; and a sheet member provided only at an end portion of the developing cartridge in a direction of the rotational axis of the developing roller, wherein, in a state in which the developing cartridge is oriented in a direction in which the developing cartridge is mounted on an image forming apparatus, (i) the frame includes a bottom surface forming a part of the accommodating portion and a wall portion extending upward from the bottom surface, (ii) the wall portion is provided at an end portion of the frame in a direction orthogonal to both the direction of the rotational axis of the developing roller and a direction of gravity, (iii) only one surface of the sheet member is attached to a surface of the wall portion, and (iv) as seen in the direction of the rotational axis, a line extending along and upward from the surface of wall portion does not cross the developing roller.

2. The developing cartridge according to claim 1, wherein an end portion of the sheet member in a direction orthogonal to the rotational axis opposes a first surface region of the developing roller in a non-contact state, the first surface region being on a side opposite to a second surface region of the developing roller opposing the opening portion, and the first surface region being exposed outside the developing cartridge, and wherein, as viewed in the direction of the rotational axis, the sheet member and the regulating member are in a same cross section.

3. The developing cartridge according to claim 1, wherein the sheet member is a first sheet member and the end portion is a first end portion of the frame, and wherein, in the direction of the rotational axis, a second sheet member is provided at a second end portion that is opposite to the first end portion.

4. The developing cartridge according to claim 1, wherein, in the state in which the developing cartridge is mounted on the image forming apparatus and as seen in the direction of the rotational axis, the line extending upward from the surface of the wall portion does not cross a line extended downward from a surface of the frame that supports the support portion of the regulating member.

5. The developing cartridge according to claim 1, wherein the image forming apparatus includes a photosensitive drum to which the toner is supplied by the developing roller, wherein, in a state that the developing cartridge is mounted on the image forming apparatus, the sheet member is provided between a gear and a transfer roller in the direction of the rotational axis, and wherein the gear fits to one end portion of a photosensitive drum and the transfer roller rotates in contact with the photosensitive drum.

* * * * *